(12) United States Patent
Al-Bagoury

(10) Patent No.: US 8,585,819 B2
(45) Date of Patent: Nov. 19, 2013

(54) AQUEOUS SLURRY OF AMORPHOUS SILICA AND METHOD FOR ITS PRODUCTION

(75) Inventor: Mohamed Al-Bagoury, Kristiansand S (NO)

(73) Assignee: Elkem AS, Oslo (NO)

( * ) Notice: Subject to any disclaimer, the term of this patent is extended or adjusted under 35 U.S.C. 154(b) by 0 days.

(21) Appl. No.: 13/811,850

(22) PCT Filed: May 16, 2011

(86) PCT No.: PCT/NO2011/000151
§ 371 (c)(1),
(2), (4) Date: Jan. 23, 2013

(87) PCT Pub. No.: WO2012/015308
PCT Pub. Date: Feb. 2, 2012

(65) Prior Publication Data
US 2013/0118383 A1    May 16, 2013

(30) Foreign Application Priority Data
Jul. 26, 2010 (NO) .................................. 20101066

(51) Int. Cl.
*C04B 14/06* (2006.01)
*C04B 14/04* (2006.01)

(52) U.S. Cl.
USPC ............ 106/486; 106/482; 106/483; 106/484

(58) Field of Classification Search
USPC .................................. 106/482, 483, 484, 486
See application file for complete search history.

(56) References Cited

U.S. PATENT DOCUMENTS

2003/0181542 A1    9/2003   Vijn

FOREIGN PATENT DOCUMENTS

| EP | 1534646 A1 | 6/2005 |
|----|-----------|--------|
| JP | 1320244 A | 12/1989 |
| JP | 2005145733 A | 6/2005 |
| WO | 9103437 A1 | 3/1991 |

*Primary Examiner* — Anthony J Green
(74) *Attorney, Agent, or Firm* — Lucas & Mercanti, LLP

(57) ABSTRACT

An aqueous slurry of amorphous silica, the amorphous silica having a particle size less than 1 μm. The slurry contains sepiolite as a stabiliser.

16 Claims, 7 Drawing Sheets

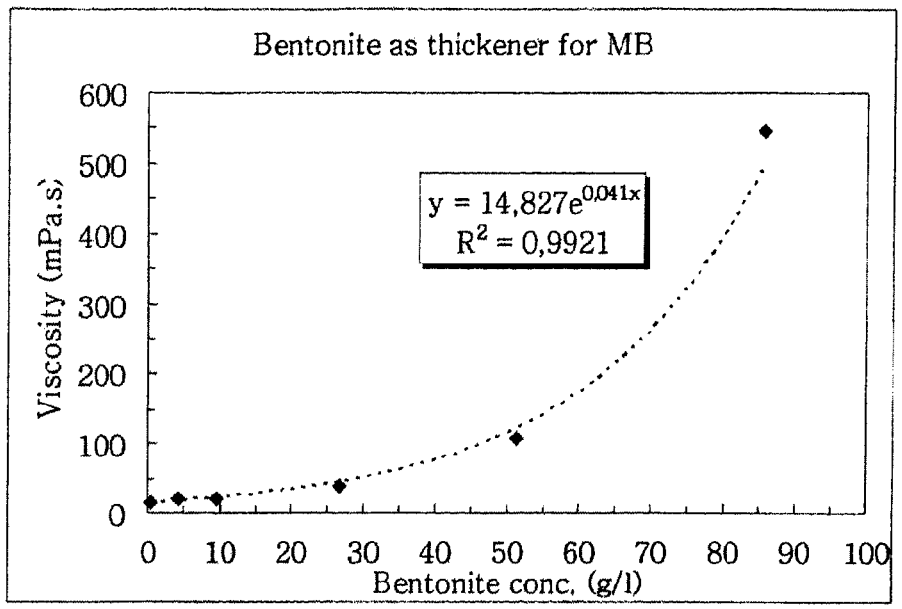
Figure 1: Viscosity of 50 wt% slurry stabilised with different level of bentonite concentration.
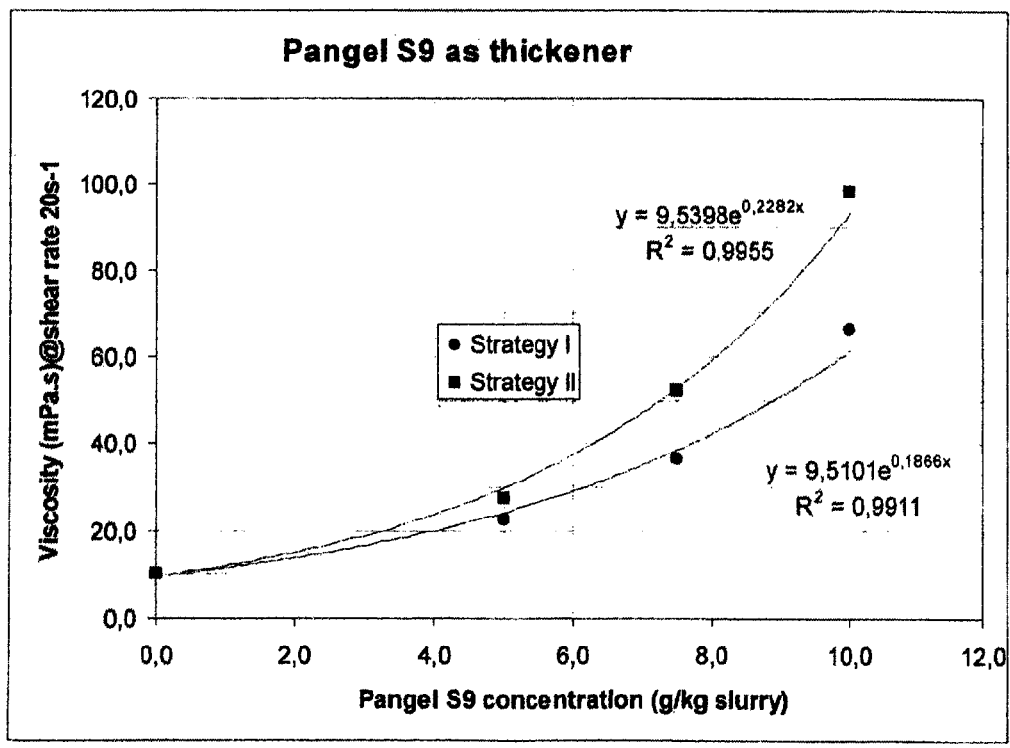
Figure 2: Viscosity of Pangel S9 stabilised slurry.

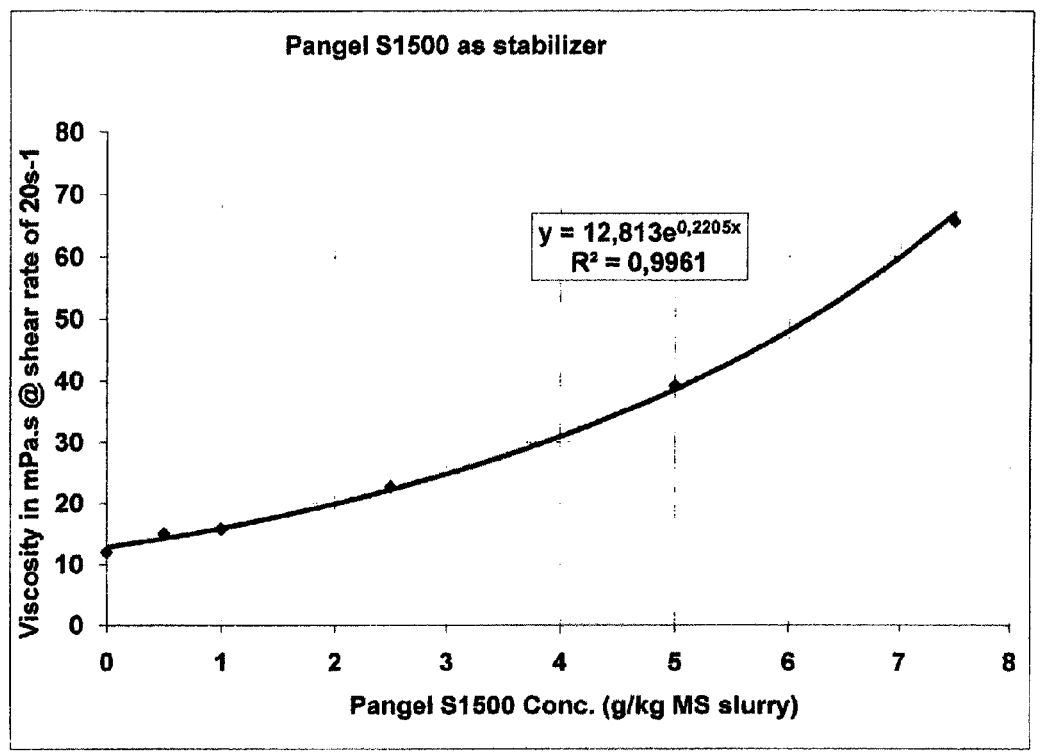
Figure 3: Viscosity of slurry as a function of Pangel S1500 concentration. Vicosity is measured afer preparation at pH 5.

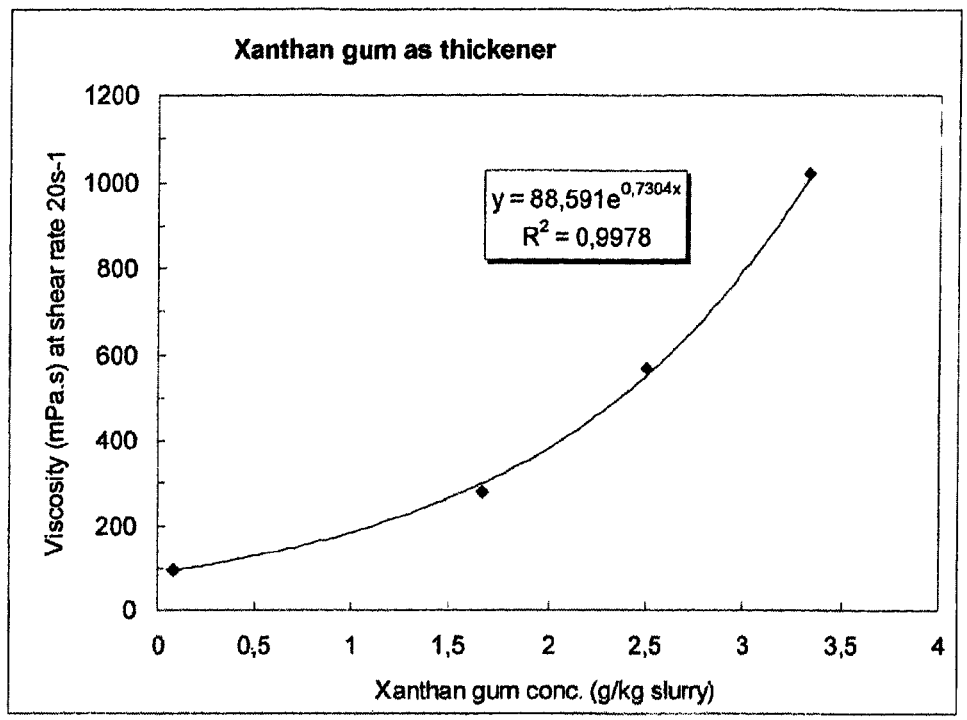
Figure 4: Viscosity of 50 wt% slurry stabilized with xanthan gum as a function of xanthan gum concentration.
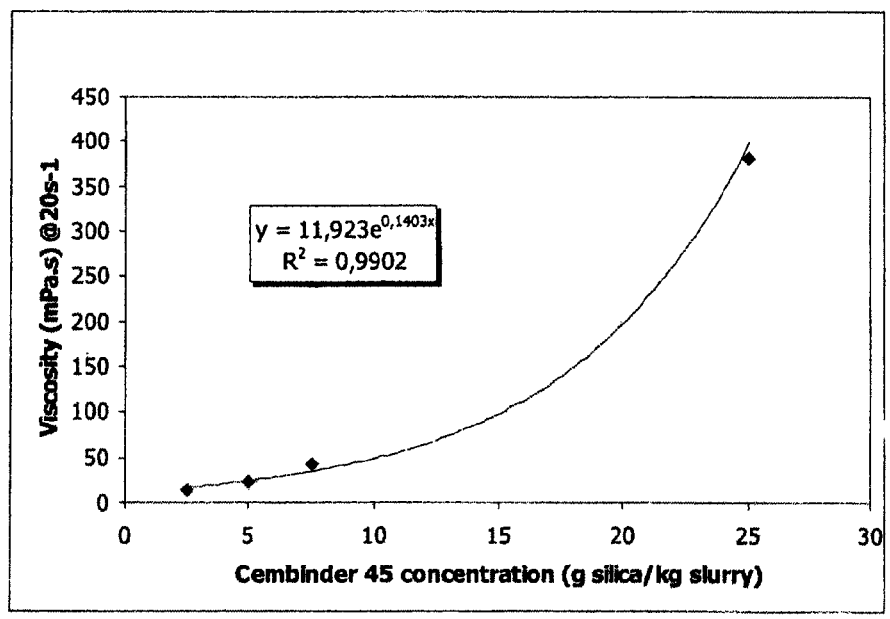
Figure 5: Viscosity of slurry doped with Cembinder 45 as a function of Cembinder 45 concentration. The viscosity was measured after two weeks aging.

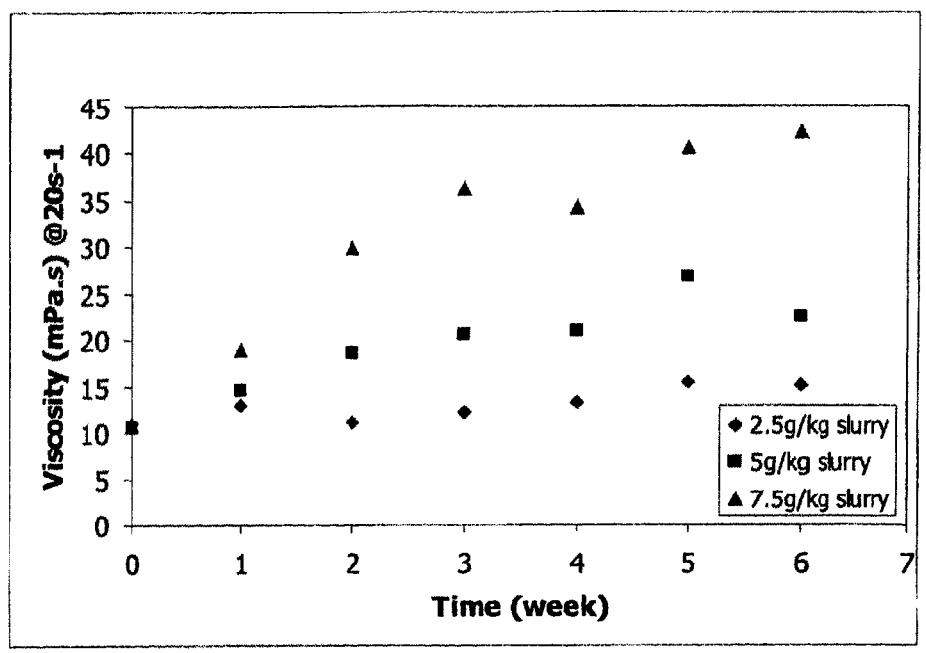
Figure 6: Viscosity of MB slurry stabilised by Cembinder 45 with different concentrations as function of time.
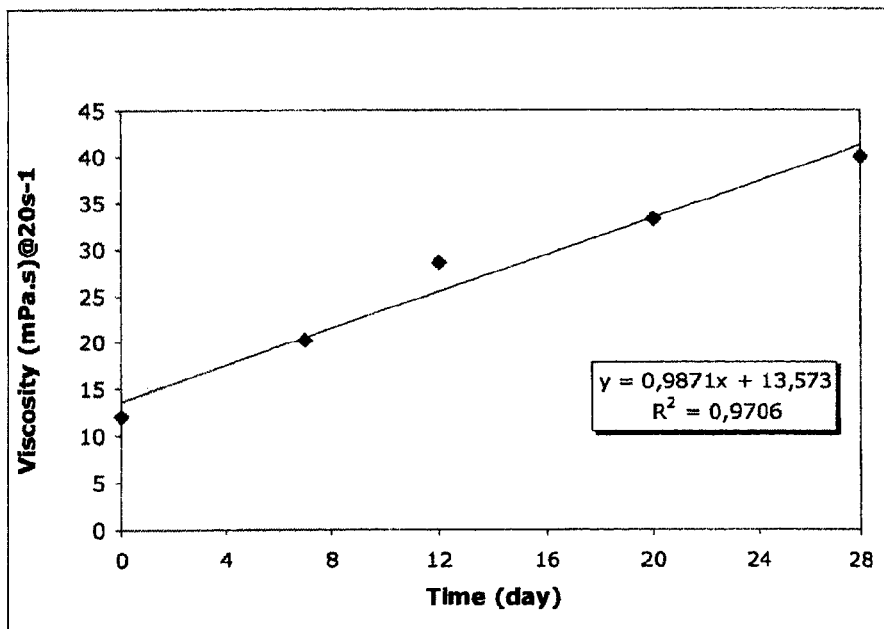
Figure 7: Cembinder 50 as stabiliser for MB. The concentration of cembinder 50 was 5g dry nanosilica/kg MB slurry. That concentration form week structure.

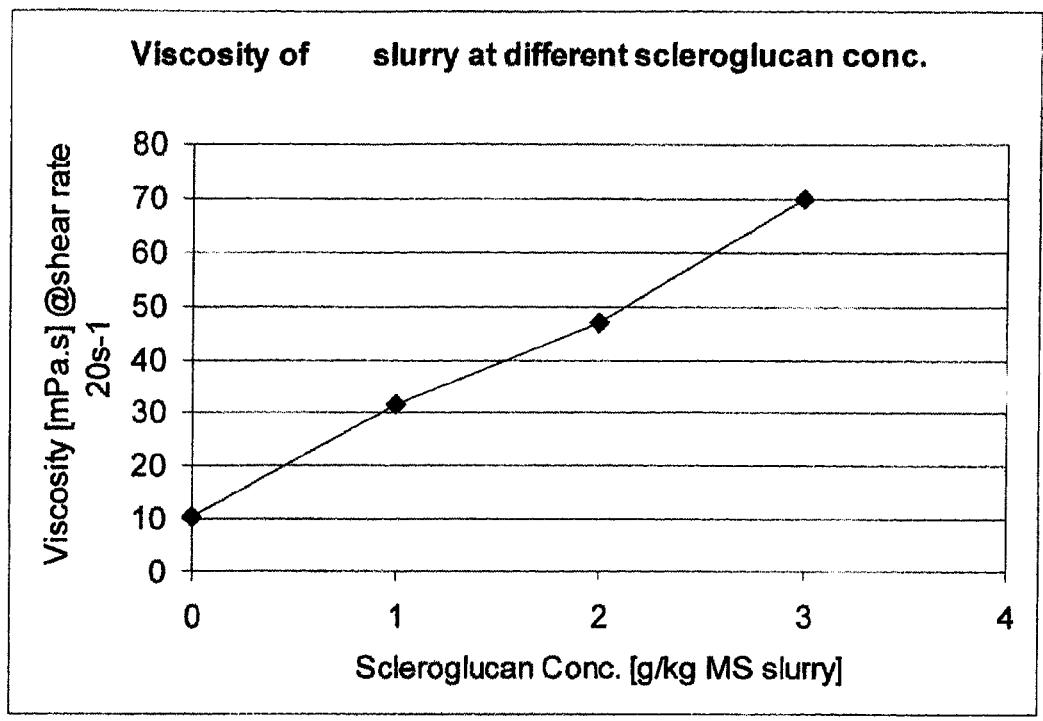
Figure 8: Viscosity of MS slurry as function of scleroglucan concentration.

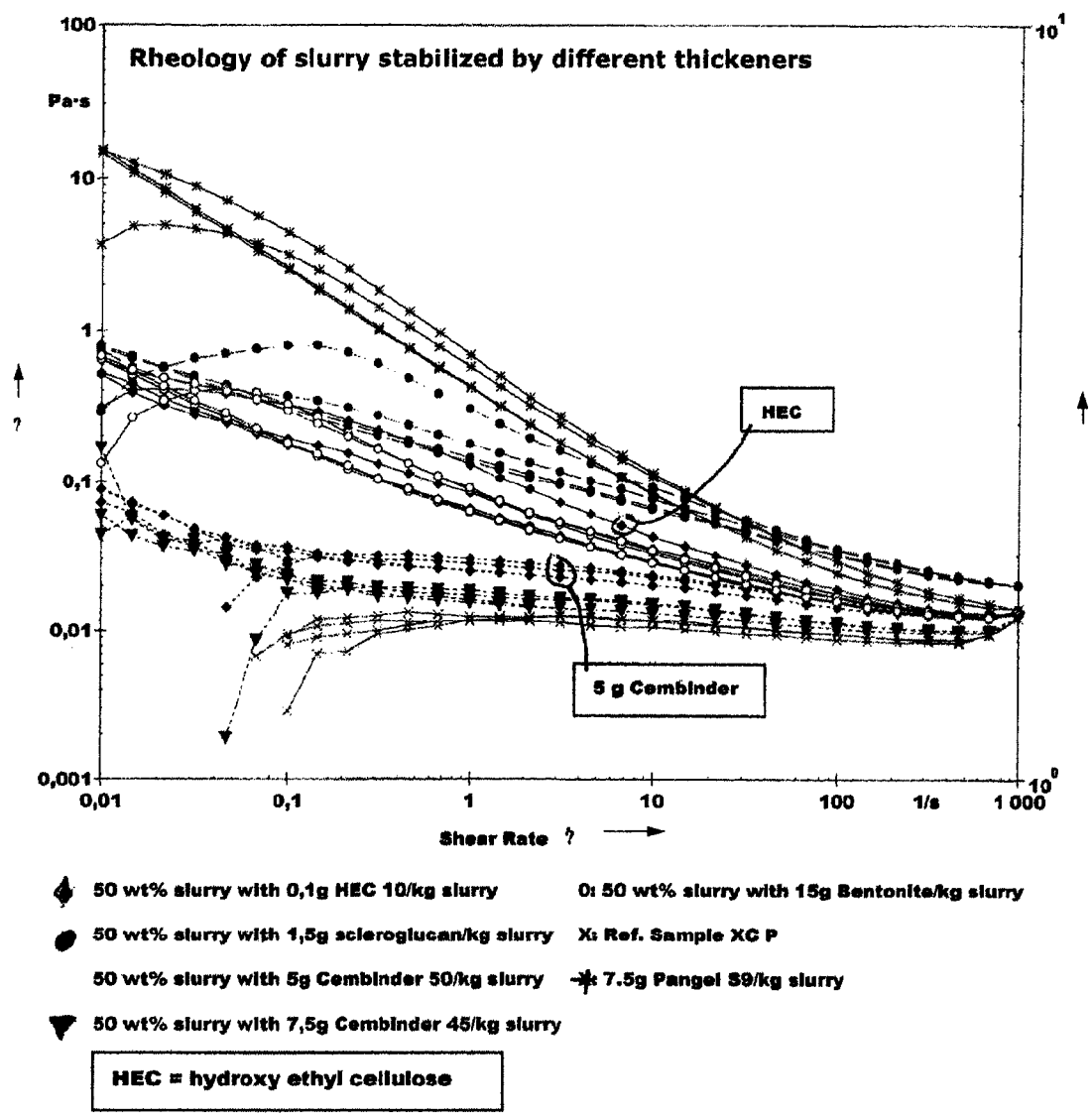
Figure 9 Viscosity of slurry stabilised with various suspending agents.

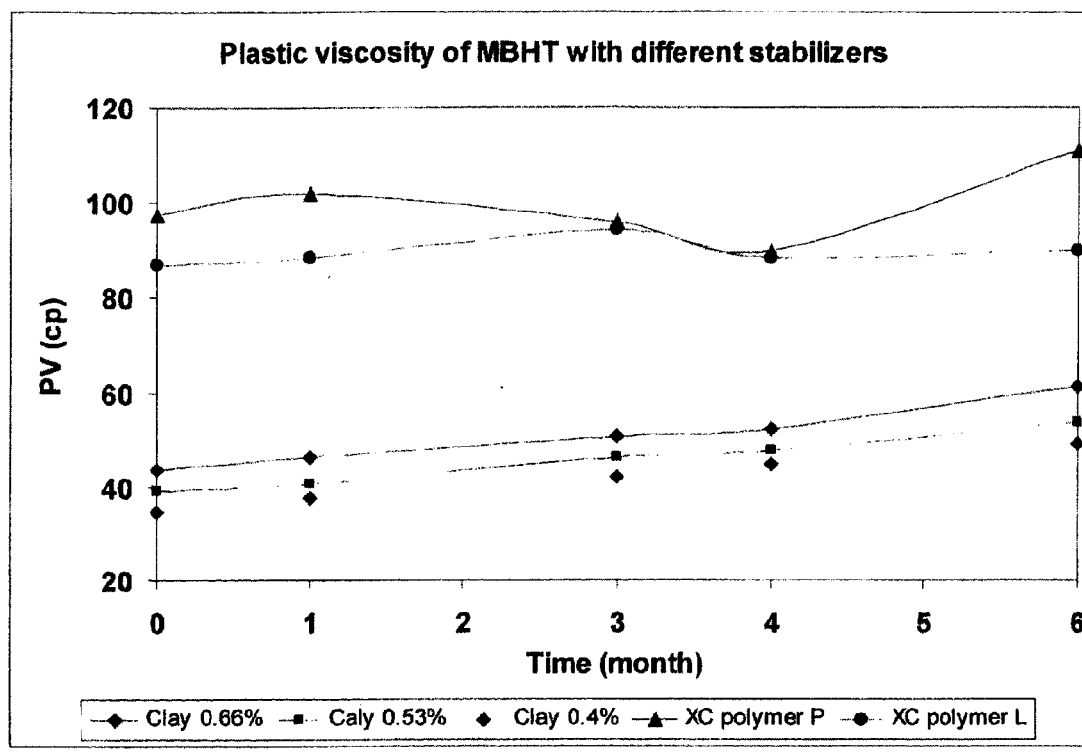
Figure 10: Plastic viscosity as function of storage time.
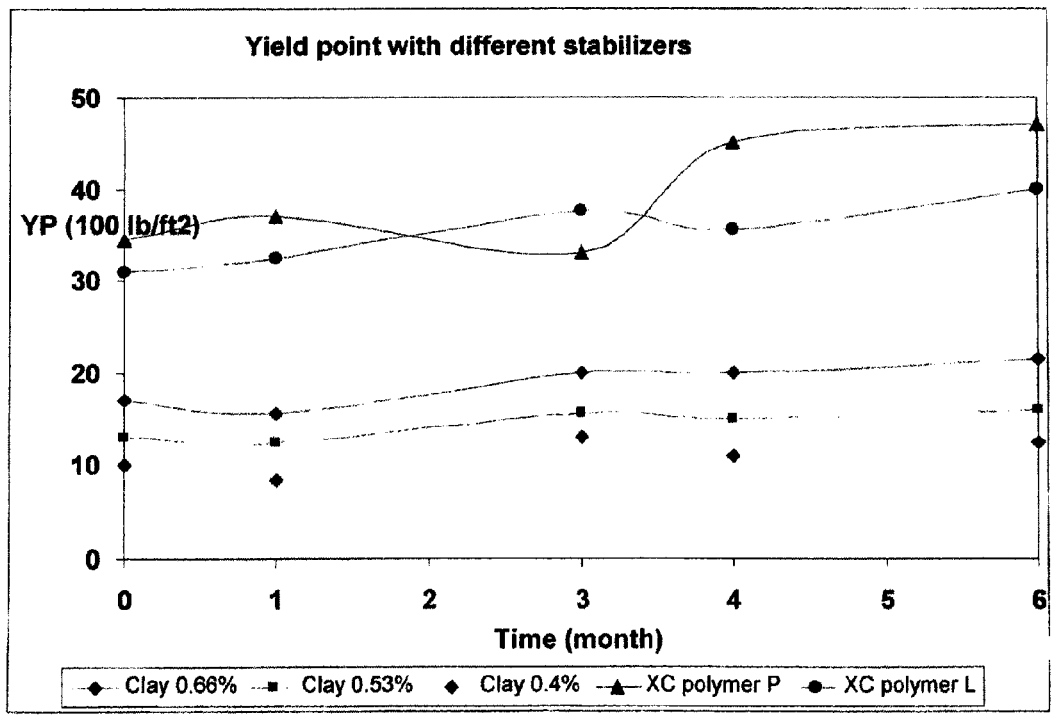
Figure 11: Yield point as function of storage time.

AQUEOUS SLURRY OF AMORPHOUS SILICA AND METHOD FOR ITS PRODUCTION

CROSS-REFERENCE TO RELATED APPLICATIONS

This application is a 371 of PCT/NO2011/000151 filed May 16, 2011, which in turn claims the priority of NO 20101066 filed Jul. 26, 2010, the priority of both applications is hereby claimed and both applications are incorporated by reference herein.

TECHNICAL FIELD

The present invention relates to an aqueous slurry of microsilica, optionally including silica flour, and to a method for producing such a slurry.

BACKGROUND ART

The terms "microsilica" and used in the specification and claims of this application refer to particulate, amorphous $SiO_2$ obtained from a process in which silica (quartz) is reduced to SiO-gas and the reduction product is oxidised in the vapour phase to form amorphous silica. Microsilica may contain at least 70% by weight silica ($SiO_2$), and preferably >97% and has a specific density of 2.1-2.3 $g/cm^3$ and a surface area of 12-40 $m^2/g$, typically 20 $m^2/g$. The primary particles are substantially spherical and may have an average size of about 0.15 μm. Microsilica is preferably obtained as a co-product in the production of silicon alloys in electric reduction furnaces.

Microsilica slurry is currently used widely in construction applications such as fibre cement, concrete and in oil well cementing. Microsilica acts as pozzolanic material or inorganic binder by interacting with calcium hydroxide as a hydration product of Portland cement and water to improve the compressive strength of cement. In all of these applications, it has been demonstrated that microsilica used in slurry form performs much better than in powder form. Most commercially available microsilica slurries are normally supplied as 50 wt % microsilica slurries. Sulphuric acid is normally used to adjust the pH of the dispersion to lie in the range 4 to 7, to give stability to the dispersion.

Conventional microsilica slurry suffers from two challenges, namely, geletion and settling.

The stability of a microsilica slurry in terms of sedimentation and geletion depends mainly on the quality of the dry microsilica used for making the slurry. Since microsilica has a very small particle size, a slurry will show a high stability towards sedimentation when stored for long periods of time; more than 3 months for a well-dispersed slurry. However, when considering the stability of a microsilica slurry, a distinction should be made between particle settling and geletion.

Settling is a natural phenomenon for many inorganic dispersions such as silica, alumina or titania. According to Stoke's low, the main factors affecting settling are the low apparent viscosity of the continuous phase (water) and the size of the dispersed particles. The larger the dispersed particles, the faster the settling rate will be. Generally, a 50 wt % silica slurry with a $SiO_2$ content >95 wt % has a high potential for settling due to the low apparent viscosity of <20 mPa·s at a shear rate of 20 $s^{-1}$. Settling of coarse particles can be avoided by sieving the slurry or by increasing the viscosity of slurry by employing thickening agents such as Xanthen gum, cellulose, polyacrylate or nanosilica.

Geletion or network formation by the particles occurs when the particles are attracted to each other due to Van der Waals forces and/or chemical bridging by cations, creating a network structure which can have different forms and strengths. The main factor influencing geletion in the case of a microsilica slurry is contamination with other inorganic metal oxides such as $K_2O$, $Na_2O$, CaO, MgO, $Al_2O_3$ and $Fe_2O_3$. These oxides occur naturally in microsilica and dissolve to a certain extent into the water, providing the aqueous phase with different types of cations which tend to make bridges between the particles.

The bridging causes the microsilica particles to agglomerated or flocculate which results in a high viscosity and even gel or paste formation in some cases.

Generally, microsilica can be classified into three types according to the tendency to form a gel:
a) Not forming a gel would be microsilica with a total metal oxide (TMO) below 3 wt %.
b) Microsilica forming a gel (network) would be microsilica with a TMO larger than 3 wt %.
c) Microsilica forming a hard gel (network) would be with a TMO larger than 10 wt %.

These problems of settling and gelling are addressed in the present Applicants' EP 1534646, in which a polysaccharide is included in a slurry of water amorphous silica and silica flour, as a stabiliser. This measure is effective but it has now been found that in some instances, there is a deterioration of this slurry caused by biodegradation of the polysaccharide, due to bacterial attack. It is possible to avoid the biodegradation by adding biocides, but this is not a satisfactory solution as biocides could cause contamination of the environment during use of the slurry. For offshore oil industry the regulations demand biocide free products in order not to harm the aquatic organisms.

It is an object of the present invention to provide an aqueous slurry of amorphous silica which is stable for at least six months, both from the point of view of settling and gelling, and at the same time, to avoid the use of polysaccharides and other biodegradable additives.

DESCRIPTION OF INVENTION

According to one aspect of the invention, there is provided an aqueous slurry of amorphous silica, the amorphous silica having a particle size less than 1 μm, characterised in that the slurry contains sepiolite as a stabiliser.

It has been found that surprisingly, sepiolite, a hydrated magnesium silicate, can stabilise an aqueous amorphous silica slurry, without the need to employ a polysaccharide.

Sepiolite is a hydrated magnesium silicate ($Mg_8Si_{12}O_{30}$·$(OH)_4(OH_2)_4$·$8(H_2O)$) mineral occurring naturally, either in a fibrous metamorphic form or in a sedimentary form, as a clay. The individual particles of sepiolite have a needle-like morphology with a diameter in the range of 10-100 nm and a length of 1-2 μm. An aqueous dispersion of sepiolite exhibits shear thinning properties and therefore it can be used as viscosifier. The specific surface area is high (BET 320 $m^2/g$). It has slightly negative charge on the surface and therefore it shows less response to the presence of electrolytes and is stable over a wide range of pH values. Pangel S9, Pangel HV and Pangel S1500 are proprietary types of sepiolite, supplied by Tolsa, Spain.

Preferably, the sepiolite is present as 0.1 to 1% by weight of the slurry, more preferably as 0.2 to 0.5% by weight of the slurry. Preferably, the slurry has a solids content in the range 40 to 80 wt % of the slurry, preferably about 50 wt %.

The slurry may also comprise silica flour, in addition to the amorphous silica. The slurry may contain varying amounts of amorphous silica and silica flour, but the amount of amorphous silica is generally between 15-50% by weight based on the weight of the slurry and the amount of silica flour is generally between 30 and 60% by weight based on the weight of the slurry.

Preferably, the silica flour has a particle size in the range 2 to 200 μm.

Preferably, the silica flour constitutes up to 65 wt % of the total solids content of the slurry.

According to another aspect of the invention, there is provided a method for the production of an aqueous slurry containing water and amorphous silica having a particle size less than 1μm, characterised in that sepiolite is included in the slurry as a stabiliser.

Preferably, a high shear mixer is used to prepare the slurry initially, and to mix in any additional components. Preferably, the sepiolite is hydrated with water and is then added to the slurry of water and amorphous silica, and mixed to form a stabilised slurry.

Preferably, the amount of sepiolite added is in the range 0.1 to 1.0% by weight of the slurry, more preferably 0.2 to 0.5%. Preferably, the amount of water and the amount of solids are arranged so that they solids content of the slurry is in the range 40 to 80 wt % of the slurry, preferably about 50 wt %.

Preferably, silica flour is also added to the slurry. The sepiolite may be added to the slurry before or after the silica flour.

Preferably, the pH of the slurry is adjusted to a value in the range 4 to 7. Conveniently, the pH adjustment is effected by the addition of sulphuric acid. A dispersant may be employed to eliminate any undesirable interactions between the silica particles that enhanced by the various metal oxides exist in the slurry. Preferably, the dispersant is an anionic dispersant, such as castament FS20 (from BASF) and may be added in an amount in the range 0.1 to 0.5 g/kg slurry, e.g. about 0.25 g/kg.

BRIEF DESCRIPTION OF THE DRAWINGS

FIG. 1 illustrates the viscosity of a 50 wt % slurry stabilized with different levels of bentonite concentrations;

FIG. 2 illustrates the viscosity of a Pangel S9 stabilized slurry;

FIG. 3 illustrates the viscosity of a slurry as a function of Pangel S1500 at various concentrations measured after preparation of at pH 5;

FIG. 4 illustrates the viscosity of a 50 wt % slurry stabilized with xanthan gum as a function of xanthan gum concentration;

FIG. 5 illustrates the viscosity of a slurry doped with Cembinder 45 as a function of the concentration of Cembinder 45, the viscosity was measured after two weeks of aging;

FIG. 6 illustrates the viscosity of a microsilica slurry stabilized by Cembinder 45 at different concentrations and at different times;

FIG. 7 illustrates the viscosity of the Cembinder 50 stabilized microsilica slurry where the concentration of Cembinder 50 was 5 grams per dry nanosilica/kilogram of microsilica slurry;

FIG. 8 illustrates the viscosity of a microsilica slurry as a function of Sceroglucan concentration;

FIG. 9 illustrates the viscosity of a plurality of miorosilica slurries stabilized with various suspension agents;

FIG. 10 illustrates the plastic viscosity of various microsilica slurries as a function of storage time; and FIG. 11 illustrates the viscosity of the yield point as a function of storage time for various microsilica slurries.

DETAILED DESCRIPTION OF THE INVENTION

The invention may be carried into practice in various ways and some embodiments will now be described in the following non-limiting Examples.

EXAMPLES

In the following Examples 1 to 5, the performances of various additives were investigated to determine their effectiveness as a stabiliser for an aqueous slurry of amorphous silica. In each Example, the slurry used was a 50 wt % mixture of amorphous silica and water, buffered to pH5 with sulphuric acid.

Example 1

Bentonite

Bentonite is aluminosilicate clay with a plate structure. Bentonite presents strong colloidal properties and its volume increases several times when coming into contact with water, creating a gelatinous and viscous fluid. The special properties of bentonite (hydration, swelling, water absorption, viscosity and thixotropy) make it a valuable material for a wide range of uses and applications. It is commonly used as a viscosifier in oil well drilling.

To determine the optimal bentonite concentration needed to stabilise the 50 wt % slurry, different amounts of dry bentonite were added. As shown in FIG. 1 the shear viscosity is in an exponential relation to the amount of bentonite added in g/l. A concentration range of bentonite between 30-50 g/l might be suitable for preventing settling. Particle size distribution curves for the slurry with and without bentonite, show a slight increase of D50 with increasing bentonite concentration, as shown in Table 1.

TABLE 1

Particle size analysis of slurry without and with bentonite

| | D10 | D50 | D90 |
|---|---|---|---|
| Slurry | 0.070 | 0.147 | 0.371 |
| Slurry + 20 g/l bentonite | 0.071 | 0.153 | 0.495 |
| Slurry + 40 g/l bentonite | 0.072 | 0.159 | 0.807 |

The investigation also showed that bentonite tends to form hard gel over time even when using low dosages. Therefore, bentonite is not a suitable stabiliser for the amorphous silica slurry.

Example 2

Sepiolite

Three different types of sepiolite materials were investigated, as listed in Table 2. Pangel HV and Pangel S9 were relatively difficult to disperse in the slurry compared to Pangel S1500. No hydration time was required in the case of the sepiolite, though hydration time was necessary for bentonite and the biopolymer tested below.

TABLE 2

Properties of Pangel products tested

| Product | Pangel S1500 | Pangel HV | Pangel S9 |
|---|---|---|---|
| Moisture (%) | 11.5 | 7 | 8 |
| Bulk Density (g/l) | 260 | 425 | 60 |
| pH | 10.1 | 8.8 | 8.8 |
| Brookfield Viscosity (cp) at 5 rpm 6% 18 m/s 5 min | 34,000 | 51,000 | 39,000 |
| Wet sieving Retained in 44 μm sieve in % by the weight of dry matter | 3.2 | 0.3 | 0.1 |

As shown in FIG. 2, three different concentration levels of Pangel S9 were tested with microsilica slurry containing 50 wt % microsilica from Elkem AS Bremanger with two different addition strategies. Strategy I was the addition of Pangel S9 as a powder into the slurry and then the adjustment of the solid content of the slurry with adding the required amount of water to attain 50 wt % slurry. Strategy II was the addition of Pangel S9 in a slurry form (about 5 wt %) into a 60 wt % amorphous silica slurry and the subsequent adjustment of the solid content to 50 wt %.

It was observed, as shown in FIG. 2, that Strategy II provide the better results in terms of high gel structure with a lower amount of Pangel S9. In the optimal operating range, which is between 5-10 g Pangel/kg slurry, the use of Strategy II could save around 20 wt % of the total Pangel needed, compared to Strategy I.

The thermal stability of the slurry was tested by keeping the slurry at a temperature of 35° C. for 6 months. In the first month, the rheology of the slurry was studied weekly and after than it was monitored monthly.

FIG. 3 shows the viscosity of the slurry stabilised with Pangel S1500 to be in an exponential correlation with the clay concentration. Even at a very low Pangel concentration of 0.5 g/kg slurry, a network was formed.

The optimal concentration fro Pangel S1500 to stabilise the 50 wt % slurry lies in the range of 2 to 5 g/kg slurry.

Tests were also made with Pangel HV. 5 grams of Pangel HV was added to a 50 wt % microsilica slurry from Elkem Bremanger.

The mixing speed of the warring blender was varied between 4000 and 12000 rpm with a mixing time of 30 sec. As can be seen from Table 3 the viscosity was slightly increased and the average particle size (D50) was slightly decreased indicating better dispersability of the Pangel HV in the slurry at high shear rate.

TABLE 3

Effect of mixing speed on the rheology and particle size distribution of microsilica slurry containing Pangel HV (5 g/kg slurry).

| Time (sec) | Speed (rpm) | pH | Viscosity (mPa · s) | PSD in μm | | |
|---|---|---|---|---|---|---|
| | | | | D10 | D50 | D90 |
| 30 | 4000 | 4.7 | 31.5 | 0.073 | 0.161 | 0.606 |
| 30 | 8000 | 4.8 | 35.9 | 0.072 | 0.155 | 0.460 |
| 30 | 12000 | 4.9 | 40.4 | 0.072 | 0.153 | 0.437 |

Tests were also done with different mixing times for microsilica slurries containing 10 g per kg of microsilica slurry. As is shown in Table 4 the viscosity was quite constant at the different mixing time and that means the time of 60 sec is enough to disperse the Pangel HV into the MS slurry.

TABLE 4

Effect of mixing time on the viscosity of MS slurry containing Pangel HV with a concentration of 10 g/kg slurry.

| Mixing time (sec) | pH | Viscosity (mPa · s) |
|---|---|---|
| 60 | 5.1 | 150.1 |
| 120 | | 139.3 |
| 180 | | 140.9 |

Samples of microsilica slurries containing 50 wt % microsilica were stabilized with 0.5% Pangel HV. The samples were tested when made and after 3 and 6 months. After 6 months the slurries were stable and showed no settling and as can be seen from Table 5 the viscosity only increased from 57 to 90.1 mPa·s.

TABLE 5

Viscosity of microsilica slurries (MB) with Pangel HV, fresh and after 3 and 6 months.

| Test | Day | Time (sec) | pH | Viscosity (mPa · s) |
|---|---|---|---|---|
| MB + Pangel HV | Sep. 06, 2009 | 30 | 5.49 | 57.2 |
| MB + Pangel HV | Nov. 06, 2009 | | 5.51 | 51.3 |
| MB + Pangel HV | Jan. 12, 2009 | | 6.31 | 90.1 |

Example 3

Xanthan Gum

FIG. 4 shows the viscosity of the slurry stabilised with xanthan gum as a function of xanthan gum concentration.

Slurry stabilised with xanthan gum tended to form a hard gel over time. In addition, experience has shown that xanthan gum tends to be biodegraded by bacterial and fungal attack. The use of a biocide is not desirable for offshore applications and therefore xanthan gum is not a good candidate.

Example 4

Colloidal Silica

Colloidal silica is amorphous silica particles with a size in the range 5-100 nm dispersed in water with a solid load in the range from 15 to 50 wt %. The typical pH range is from 9-11. Colloidal silica is produced via cationic exchange with sodium silicate at the desired pH, where the polymerization takes place. The sol is stabilised by pH adjustment and concentrated to the desired content. The surface of colloidal silica like many other silica particles, consists mainly of hydroxyl groups, or —Si—O—H, though other groups such as silandiol, —Si—(OH)$_2$, silanetriol, —Si(OH)$_3$, surface siloxanes, —Si—O—Si—O—, and surface-bound water may also be present. The surface of colloidal silica is anionic in an alkaline medium. It is stabilised with cations such as sodium or ammonium. In the case of cationic sols, polyaluminum chloride can be used as stabilising agent. Two colloidal silica, Cembinder 45 and 50, supplied by Eka Chemicals AB, Sweden, were used in this study. The properties are set out in Table 6.

TABLE 6

Properties of Cembinder 45 and 50 from Eka Chemicals AB.

|  | pH | Cond. (ms/cm) | Solid Content (%) |
|---|---|---|---|
| Cembinder 45 | 10.03 | 5.32 | 33.15 |
| Cembinder 50 | 10.28 | 3.25 | 17.06 |

The first set of experiments with Cembinder as stabiliser for the slurry was conducted at different levels of concentration of Cembinder 45 ranging from 2.5 to 25 g dry silica/kg slurry. Cembinder 45, with a solid loading of 33 wt % was added as slurry into an amorphous silica slurry with solid loading of 60 wt %. The solid loading in all the experiments was adjusted to 50 wt % by adding water.

As shown in FIG. 5 the viscosity of the slurry increases exponentially as function of Cembinder 45 concentration. Oscillation measurements showed that a network structure only built above a certain Cembinder concentration level of 5 g/kg slurry.

It can also been seen from FIG. 6 that the viscosity of this system increases as function of time. The reason for this may be related to the change in the surface properties of Cembinder over time, due to interaction with soluble cations in the slurry. It seems that soluble cations tend to absorb on the nanosilica particles, enhancing the network formation. At concentration levels of >10 g/kg slurry, a hard gel structure is formed with a little water on top. By agitation, the slurry can be made flowable again.

Cembinder 50 is a silica suspension with a solid loading of 17 wt % and a pH of 10. The average particle size is assumed to be below 40 nm and it was not measurable by the Malvern method due to the weak light scattering signal. As with Cembinder 45, the viscosity of the slurry doped with Cembinder 50 increases with the time. At concentrations of 5 g/kg slurry, Cembinder 45 formed a hard gel over time. This viscosity increase over time is shown in FIG. 7.

Example 5

Polysaccharide

The polysaccharide used was Scleroglucan, which is composed of glucose as a monomeric unit. Although it produces aqueous solutions with a very high viscosity, its molecular weight is not very high: Mw=540,000. The chemical structure consists of beta-1,3-D-glucose backbones with one beta-1,6-D-glucose side chain every three main backbone.

Dissolved Scleroglucan chains form a rod-like triple helical structure, in which the glucose backbones are on the outside, thus preventing the helices from coming close to each other and aggregating. In addition, Scleroglucan molecules are in a single chain random coil state when the pH is greater than 12.5.

The viscosity of the slurry stabilised with Scleroglucan as a function of the Scleroglucan is shown in FIG. 8. A gel structure starts to be formed at a concentration level >2 g/kg slurry. The viscosity was very dependent on pH, particularly above 6 which is undesirable. The viscosity changes over time. Scleroglucan also requires the inclusion of biocide. All of these facts make the use of Scleroglucan unattractive for this particular application.

FIG. 9 shows a comparison of the rheology of the slurry stabilised by the different stabilisers. Sepiolite shows the highest low shear rheology which makes it a good candidate for this application. The shear thinning properties of the sepiolite stabilised slurry indicates a weak network structure that is easily breakable by applying low shear energy. This is an important requirement, namely, a non-settleable and easily pourable slurry.

From the results of Examples 1 to 5, it would seem that Pangel 1500S is the best additive to avoid the sedimentation of an amorphous silica slurry. A concentration level of 5 g/kg slurry showed good stability for 6 months. In particular, the following formulation gave good, stable slurry;

A) pH regulating agent such as $H_2SO_4$ (dosage is quality dependent on the qualities of the silica; a typical amount is about 2 g concentrated $H_2SO_4$/kg slurry)
B) Pangel S1500 from Tolsa (5 g/kg slurry)
C) Anionic dispersant such as Castament FS20 from BASF (0.25 g/kg slurry)

Pangel S1500 builds a network structure to suspend the large particles. Castament FS20 is a dispersing agent used to weaken the effect of cationic species in the aqueous phase that are responsible for gel information

Example 6

Example 6 compares the performance of sepiolite with xanthan gum as a stabiliser for an aqueous slurry of amorphous silica and silica flour.

Two known slurry compositions using xanthan gum were tested, designated XC polymer P and XC polymer L. XC polymer P is a powder polymer for received from Jungbunzlauer and XC polymer is a liquid polymer received from CP Kelco Oil Field Group. The xanthan gum concentration in the both tests was 0.072 g/kg slurry. These were compared with three slurry compositions using three different amounts of sepiolite clay. The sepiolite used was Pangel S9.

The three sepiolite-containing compositions were made up as follows:

SEP A1 (1%)—10 g Pangel S9 were added to 20 g $H_2O$
SEP B1 (0.8%)—8 g Pangel S9 were added to 16 g $H_2O$
SEP C1 (0.6%)—6 g Pangel S9 were added to 12 g $H_2O$ Then, 30 g of SEP A1 were added to 970 g of a 50 wt % aqueous slurry of amorphous silica and mixed to form SEP A2

24 g of SEP B1 were added to 976 g of a 50 wt % aqueous slurry of amorphous silica and mixed to form SEP B2

18 g of SEP C1 were added to 982 g of 50 wt % aqueous slurry of amorphous silica and mixed to form SEP C2

Then, 710 g of silica flour (Sibelco M10) were added to 800 g of each of the slurries SEP A2, SEP B2 and SEP C2 and then mixed to form, respectively, SEP A3, SEP B3 and SEP C3. The pH of these slurries was adjusted to pH5 using sulphuric acid.

Long term stability tests were carried out on the five compositions. The results are shown in FIGS. 10 and 11.

The pH of all the slurries was adjusted at the beginning of the test to 5 and after 6 months, the pH of all the samples varied between 6.0 and 6.4, showing good stability.

All the slurries showed no settling during the 6 months period. All the slurries also showed a soft gel consistency. The gel strength can be correlated to the yield point. The gels of the sepiolite slurries were softer than the ones with xanthan gum.

The plastic viscosity of the sepiolite slurries was less by 3 magnitudes than the plastic compared to viscosity of the slurries with xanthan gum. The yield points were also less compared to the xanthan gum slurries.

The optimal dosage of Pangel S1500 was determined after many lab trials, to lie in the range of 2-10 g/kg slurry. Below that range settling of silica flour tends to take place. Above that range the slurry tends to form an undesirable gel over time. The optimal clay dosage is 3.5 g/kg slurry. This gives enough stability and a low production cost. Adding the clay before or after silica flour has no effect on the product rheology and consequently on the product stability.

The use of sepiolite clay as a stabiliser for the slurry showed successful results. Based on these results, XC polymer can be replaced by sepiolite clay with a concentration of 0.35 wt % of the slurry. That will reduce production costs and will avoid the addition of preserving agents for any biopolymer. The new composition based on adding sepiolite clay is quite simple with just 3 chemicals in addition to the water. The rheological properties of the new modified slurry are better than for a conventional slurry in terms of PV and YP, and so less pumping energy is needed to transport the product.

Application Test: Oil Well Cement Test.

The silica slurry according to the invention stabilized by sepiolite was tested in an oil well cement with a density of 1.9 kg/m$^3$ and compared with similar slurry stabilized by xanthan gum.

The cement test was conducted according to the API 10 standard. The recipe shown in Table 7 was used to prepare cement slurries with a density of 1.9 kg/m$^3$.

TABLE 7

Recipe of oil well cement containing an aqueous slurry of amorphous silica and silica flour.

| Ingredients | Amount in grams |
| --- | --- |
| G-cement (g) | 600 |
| Fresh water (g) | 200 |
| Silica slurry | 330 |
| Dispersant | 18 |
| Fluid loss additive | 15.12 |
| Retarder | 7.68 |
| Antifoam agent | 0.9 |

The following equipment were used to prepare and characterize the cement slurries:

Chandler fann 35 rheometer with thermo-cup, consistometer, equipment for measuring fluid loss (HTHP), constant-speed warring mixer, 200-250 ml measuring cylinder and precision balance.

The results as stated in Table 8 show that the rheological properties (plastic viscosity [PV] and yield point [YP]) measured at 90° C. of the cement slurry with sepiolite stabilized silica slurry are much lower compared to the one made by xanthan gum stabilized silica slurry. The fluid loss is slightly less for the cement with sepiolite stabilized silica slurry.

The compressive strength measured by ultrasonic technique showed interesting results. The cement containing sepiolite stabilised silica slurry according to the invention showed much higher early compressive strength; 1651 psi after 12 hours compared to 688 psi for the cement containing silica slurry stabilised by xanthen gum. This is because xanthan gum acts as a retarder.

The invention claimed is:

1. An aqueous slurry comprising:
   water;
   amorphous silica, the amorphous silica having a particle size less than 1 μm; and
   sepiolite as a stabilizer in an amount of 0.1 to 1% by weight of the slurry.

2. The slurry of claim 1, wherein the sepiolite is present as 0.2 to 0.5% by weight of the slurry.

3. The slurry of claim 1, wherein the slurry has a solids content in the range 40 to 80 wt% of the slurry.

4. The slurry of claim 1, further comprising silica flour.

5. The slurry of claim 1, wherein the silica flour has a particle size in the range 2 to 200 μm.

6. The slurry of claim 1, wherein the silica flour constitutes up to 50 wt% of the total solids content of the slurry.

7. The slurry of claim 1, further comprising an anionic dispersant in an amount in the range 0.1 to 0.5% by weight of slurry.

8. A method for the production of aqueous slurry comprising:
   combining water, amorphous silica having a particle size less than 1 μm, and sepiolite in an amount in the range 0.1 to 1.0% by weight of the slurry as a stabiliser.)

9. The method of claim 8, wherein combining is accomplished by using a high shear mixer.

10. The method of claim 8, wherein the combining is accomplished by hydrating the sepiolite with water and then adding the hydrated sepiolite to the slurry of water and amorphous silica, and mixed to form a stabilised slurry.

11. The method of claim 10, wherein the amount of sepiolite added is the range 0.2 to 0.5% by weight of the slurry.

12. The method of claim 8, wherein the amount of water and the amount of solids are arranged so that the solids content of the slurry is in the range 40 to 80 wt% of the slurry.

13. The method of claim 8, wherein silica flour is added to the slurry.

14. The method of claim 13, wherein the silica flour has a particle size in the range 2 to 200 μm.

TABLE 8

Rheology and fluid loss of cement slurry using two different silica slurries.

| Cement slurry | Temperature | Readings on Fann viscometer in rpm | | | | | | | PV | YP | 1000 psi | Filter cake |
| --- | --- | --- | --- | --- | --- | --- | --- | --- | --- | --- | --- | --- |
| | | 600 | 300 | 200 | 100 | 60 | 30 | 3 | cP | lbs/100 ft2 | Fluid Loss, ml | mm |
| Silica slurry stabilized with Sepiolite | 20° C. | 205 | 117 | 86 | 50 | 34 | 20 | 9 | 100.5 | 16.5 | | |
| | 90° C. | 111 | 62 | 40 | 23 | 15 | 6 | 0 | 58.5 | 3.5 | 42 ml | 15 |
| Silica slurry stabilized with Xanthan gum | 20° C. | 267 | 167 | 127 | 79 | 59 | 40 | 20 | 132 | 35 | | |
| | 90° C. | 152 | 94 | 68 | 40 | 28 | 11 | 4 | 81 | 13 | 46 ml | 17 |

15. The method of claim 13, wherein the silica flour constitutes up to 65 wt% of the total solids content of the slurry.

16. The method of claim 8, wherein the silica flour is added to the slurry of water and amorphous silica after the addition of the sepiolite.

* * * * *